United States Patent
Yokoyama et al.

(10) Patent No.: US 11,208,001 B2
(45) Date of Patent: Dec. 28, 2021

(54) VEHICLE MANAGEMENT SYSTEM TO CONTROL SUPPLY OF POWER OR CHARGING BETWEEN ONBOARD POWER UNIT AND EXTERIOR

(71) Applicant: HONDA MOTOR CO., LTD., Tokyo (JP)

(72) Inventors: Shinichi Yokoyama, Wako (JP); Tomohide Haraguchi, Wako (JP); Takashi Sone, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/904,933

(22) Filed: Jun. 18, 2020

(65) Prior Publication Data
US 2020/0317075 A1    Oct. 8, 2020

Related U.S. Application Data

(63) Continuation of application No. PCT/JP2018/043310, filed on Nov. 26, 2018.

(30) Foreign Application Priority Data

Dec. 28, 2017  (JP) .............................. JP2017-254284

(51) Int. Cl.
*B60L 53/00* (2019.01)
*B60L 53/60* (2019.01)
(Continued)

(52) U.S. Cl.
CPC .............. *B60L 53/60* (2019.02); *B60L 53/53* (2019.02); *B60L 53/51* (2019.02); *Y02T 90/167* (2013.01)

(58) Field of Classification Search
CPC .......... B60L 53/53; B60L 53/60; B60L 53/68; B60L 53/66; B60L 53/67; B60L 53/00;
(Continued)

(56) References Cited

U.S. PATENT DOCUMENTS

| 5,642,270 A | * | 6/1997 | Green | ..................... B60L 53/64 363/17 |
| 7,991,665 B2 | * | 8/2011 | Hafner | ............... G06Q 30/0208 705/35 |

(Continued)

FOREIGN PATENT DOCUMENTS

| JP | 2002-233053 A | 8/2002 |
| JP | 2011-244682 A | 12/2011 |

(Continued)

OTHER PUBLICATIONS

International Search Report dated Feb. 5, 2019, issued in counterpart International Application No. PCT/JP2018/043310. (2 pages).

*Primary Examiner* — Naum Levin
(74) *Attorney, Agent, or Firm* — Westerman, Hattori, Daniels & Adrian, LLP

(57) ABSTRACT

A vehicle management system is provided. The system carries out at least one of controlling a supply of power from an onboard power unit in a parked vehicle to the exterior and controlling charging of the onboard power unit from the exterior. The system comprises a control unit for controlling the supply of power or charging between the onboard power unit and the exterior; a transaction managing unit for managing the supply of power or charging between the onboard power unit and the exterior; and a payment point setting unit for setting a payment point for a user associated with the parked vehicle, wherein the payment point setting unit sets the payment point on the basis of transaction information recorded by the transaction managing unit.

8 Claims, 12 Drawing Sheets

(51) Int. Cl.
  *B60L 53/53* (2019.01)
  *B60L 53/51* (2019.01)
(58) Field of Classification Search
  CPC .. B60L 2250/14; B60L 2250/16; B60L 55/00;
       B60L 50/50; Y02T 90/167; Y02T 90/12;
       Y02B 70/3225; Y04S 20/222; Y04S
       30/14; Y04S 10/126; Y04S 50/10; H02J
       7/0013; H02J 7/00; H02J 3/322
  See application file for complete search history.

(56) References Cited

U.S. PATENT DOCUMENTS

| | | | | |
|---|---|---|---|---|
| 8,725,330 B2 * | 5/2014 | Failing | ............... | B60L 53/124 |
| | | | | 701/22 |
| 8,849,687 B2 * | 9/2014 | Hakim | ............... | H02J 3/383 |
| | | | | 705/7.13 |
| 8,860,362 B2 * | 10/2014 | Kamen | ............... | H02J 7/0027 |
| | | | | 320/104 |
| 8,872,379 B2 * | 10/2014 | Ruiz | ............... | B60L 53/51 |
| | | | | 307/66 |
| 9,263,916 B2 * | 2/2016 | Ukita | ............... | H02J 13/00034 |
| 9,469,203 B2 | 10/2016 | Momose et al. | | |
| 9,731,615 B2 * | 8/2017 | Uyeki | ............... | B60L 53/305 |
| 10,406,927 B2 * | 9/2019 | Baba | ............... | H02J 3/32 |
| 2008/0039979 A1 * | 2/2008 | Bridges | ............... | B60L 53/65 |
| | | | | 700/292 |
| 2010/0332373 A1 * | 12/2010 | Crabtree | ............... | G06Q 40/04 |
| | | | | 705/37 |
| 2011/0282513 A1 | 11/2011 | Son et al. | | |
| 2012/0286723 A1 * | 11/2012 | Ukita | ............... | G06Q 10/06312 |
| | | | | 320/107 |
| 2015/0155720 A1 * | 6/2015 | Mise | ............... | H02J 7/0014 |
| | | | | 320/107 |
| 2017/0358041 A1 * | 12/2017 | Forbes, Jr. | ............... | G06Q 10/00 |
| 2019/0333166 A1 * | 10/2019 | Simpson | ............... | G06Q 50/06 |

FOREIGN PATENT DOCUMENTS

| | | |
|---|---|---|
| JP | 5002780 B2 | 8/2012 |
| JP | 2013-41324 A | 2/2013 |
| JP | 2014-137751 A | 7/2014 |
| JP | 5666593 B2 | 2/2015 |

* cited by examiner

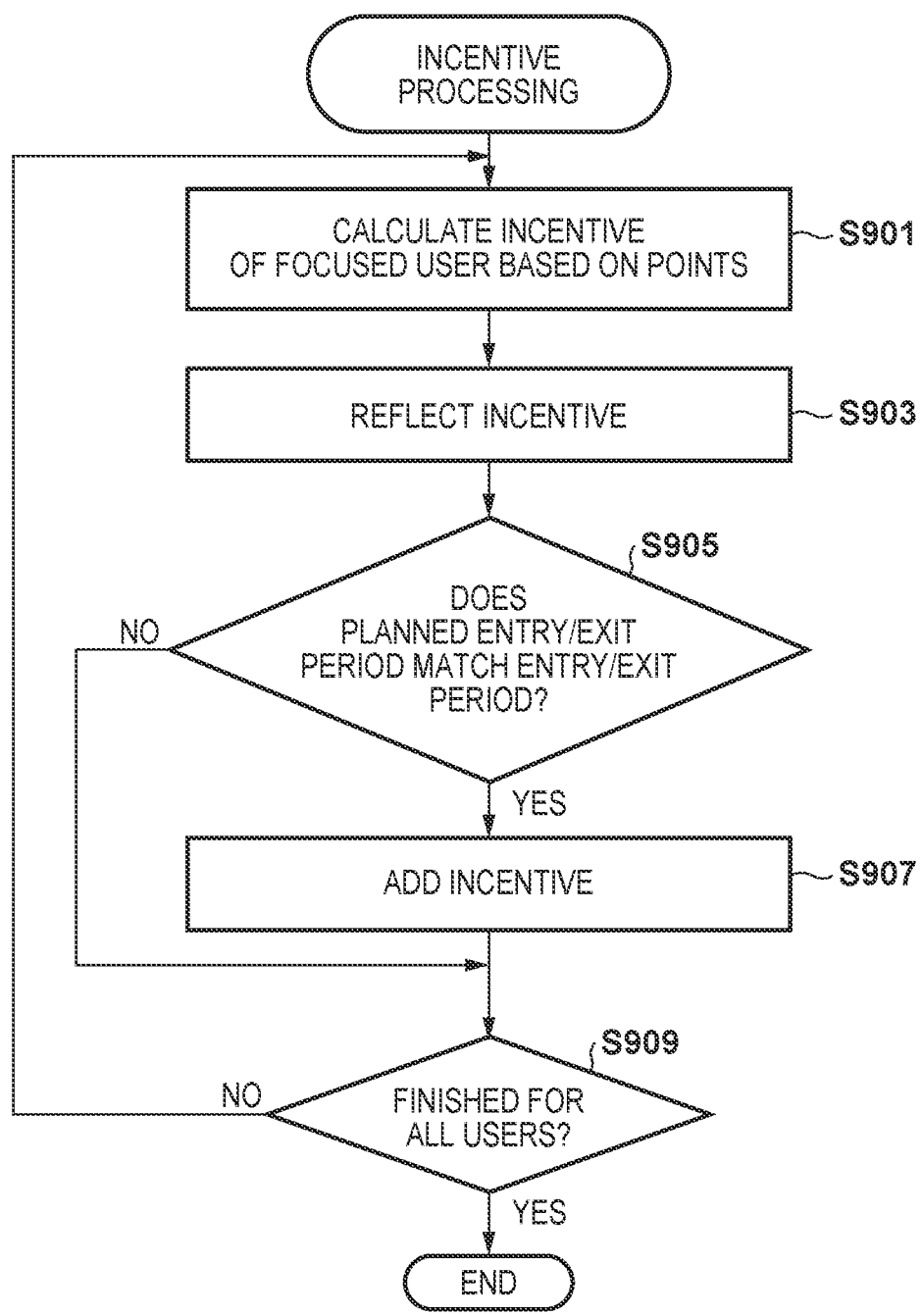

VEHICLE MANAGEMENT SYSTEM TO CONTROL SUPPLY OF POWER OR CHARGING BETWEEN ONBOARD POWER UNIT AND EXTERIOR

This application is a continuation of International Patent Application No. PCT/JP2018/043310 filed on Nov. 26, 2018, which claims priority to and the benefit of Japanese Patent Application No. 2017-254284 filed on Dec. 28, 2017, the entire disclosures of which are incorporated herein by reference.

TECHNICAL FIELD

The present invention relates to a vehicle management system for using a power source in an electric automobile or the like, for example.

BACKGROUND ART

Electric automobiles, fuel cell vehicles, series hybrid vehicles which drive electric motors using power generated by a built-in internal combustion engine, and the like are currently in everyday use as vehicles which use electric motors as primary power sources. There are also plug-in hybrid vehicles and the like, which use electric motors as supplementary power sources. Techniques have been proposed in which such a vehicle power source (called an "onboard power source" hereinafter) is used not only to drive the vehicle itself, but also to supply power to the exterior of the vehicle and level the power supply/demand (e.g., PTL 1, PTL 2, and others).

CITATION LIST

Patent Literature

PTL 1: Japanese Patent No. 5666593 specification
PTL 2: Japanese Patent No. 5002780 specification

SUMMARY OF INVENTION

Technical Problem

However, with these past techniques, the owner or user of the electric automobile, for example, must install a power supply/demand leveling system in his or her own home, in the case of PTL 1, and must pay storage battery rental fees, in the case of PTL 2. In either case, there has been little incentive for the owner or user of the vehicle to participate in the power leveling system.

Having been achieved in light of the aforementioned past examples, an object of the present invention is to provide a vehicle management system which uses an onboard battery for power supply/demand leveling, and which encourages an owner or user of a vehicle to participate in power supply/demand leveling.

Solution to Problem

In order to achieve the above object, the present invention is configured as follows.

That is, according to one aspect of the present invention, the present invention is a vehicle management system that carries out at least one of controlling a supply of power from an onboard power unit in a parked vehicle to the exterior and controlling charging of the onboard power unit from the exterior, the system comprising: a control unit configured to control the supply of power or charging between the onboard power unit and the exterior; a transaction managing unit configured to manage the supply of power or charging between the onboard power unit and the exterior; and a payment point setting unit configured to set a payment point for a user associated with the parked vehicle, wherein the payment point setting unit sets the payment point on the basis of transaction information recorded by the transaction managing unit.

Advantageous Effects of Invention

According to the present invention, an onboard battery can be used for power supply/demand leveling, and an owner or user of a vehicle can be encouraged to participate in power supply/demand leveling.

Other features and advantages of the present invention will be apparent from the following description taken in conjunction with the accompanying drawings. Note that the same reference numerals denote the same or like components throughout the accompanying drawings.

BRIEF DESCRIPTION OF DRAWINGS

The appended drawings, which are included in and constitute part of the specification, illustrate embodiments of the present invention, and along with those descriptions serve to illustrate the principles of the present invention.

FIG. 9 is a flowchart illustrating a process for granting an incentive to a user, carried out by the management server.

DESCRIPTION OF EMBODIMENTS

First Embodiment

Vehicle Management System

Figure 1:
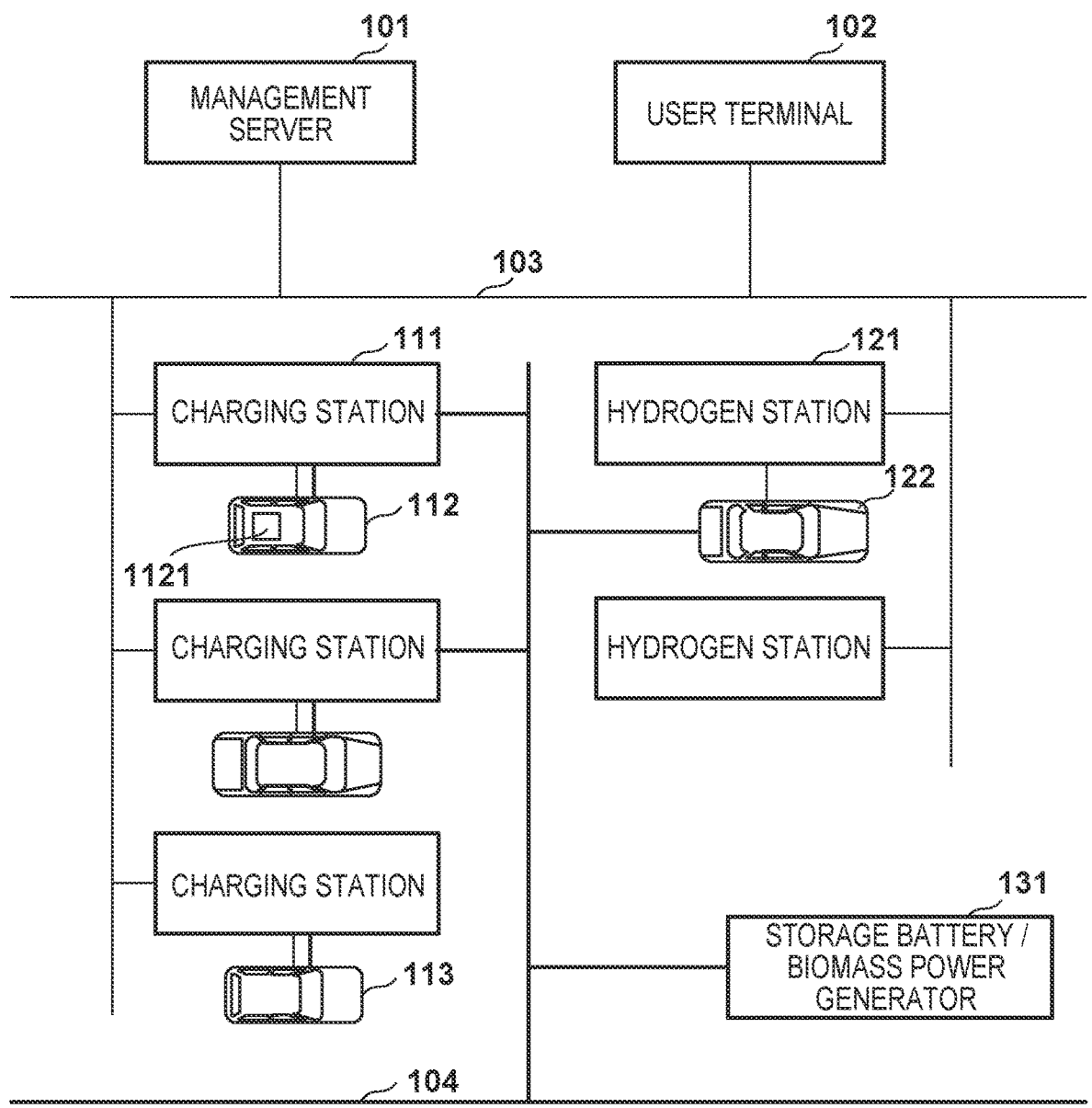
FIG. 1 is a schematic diagram illustrating a parking lot in which a vehicle management system is installed.

FIG. 1 illustrates an example of a parking lot provided with a vehicle management system according to the present embodiment. This parking lot includes equipment for charging a vehicle including a battery, such as a lithium ion battery, as a power source unit (an electric automobile (EV), a plug-in hybrid vehicle (PHEV), or the like). Note that a vehicle provided with a power source which can be charged from an external power source and can discharge to the exterior will be called an "electric automobile" in the present embodiment. A hydrogen station, which provides hydrogen refills for a fuel cell vehicle (FCV) that uses a fuel-cell as a power source, is also included. For example, an electric automobile 112, a plug-in hybrid vehicle 113, and the like can receive power from a charging station 111, and can discharge built-in power source units 1121 and the like. In the present example, one charging station 111 is provided for each electric automobile parking space. A fuel cell vehicle 122 can be refilled with hydrogen at a hydrogen station 121. Because hydrogen can be refilled in a short amount of time, the hydrogen station 121 need not be provided for each fuel cell vehicle parking space. Vehicles refilling hydrogen may take turns using the station, as with a normal gas station. Note that any number of charging stations, hydrogen stations, and so on may be provided in the parking lot.

The charging station 111 can be used not only to charge vehicles, but also to connect vehicle power sources to a power grid (also called "grid power" hereinafter) 104 run by a power company or the like, and supply (sell) power back to the power company. The fuel cell vehicle 122 can also supply power to the power grid. Power can also be exchanged among the vehicles. For example, electric automobiles can exchange power with each other, and vehicles including generators, fuel cell vehicles, and so on can supply power to electric automobiles. Although FIG. 1 illustrates the vehicles as being directly connected to the power grid, the vehicles may instead be connected via the hydrogen station 121, the charging station 111, or the like. Furthermore, assuming power can be provided to the exterior, a hybrid vehicle having a power source unit combining an internal combustion power generator, a gas generator, or the like with a battery can have its power source unit connected to the charging station 111 in order to supply power to the power grid. Using onboard power source units located in a parking lot in this manner makes it possible to implement a virtual power plant (VPP).

As power sources for charging onboard batteries aside from power supplied from the power grid, power generation equipment 131, which is its own power generating equipment, such as a storage battery, a biomass power generator, a solar power generator, or the like may be provided, or power may be purchased directly from such equipment without going through the power grid. The power which has been purchased is used for charging the power source unit through the charging station 111, and is also used as a power source for parking lot equipment such as computers and the like.

This equipment is managed and controlled by a management server 101. A user terminal 102 is also provided for user access. The management server 101, the user terminal 102, the charging station 111, and the hydrogen station 121 are connected over a communication network 103. An information processing system provided in each vehicle is also connected to the management server 101 directly, or via the charging station 111, the hydrogen station 121, or the like. In this example, a vehicle connected to the charging station 111 by a power cable is assumed to also be connected to the communication network 103. Of course, the communication network may be connected through a user operation independent from the power cable connection. Power leveling is achieved through what is known as demand response between grid power 104 and the parking lot system illustrated in FIG. 1. To realize demand response, in the present embodiment, request messages for requesting power supply or throttling of power reception when the grid power is insufficient, and ramping up power reception when there is surplus grid power capacity, messages requesting cancellations of these requests, and so on are sent as appropriate from the grid power 104 to the management server 101 over the communication network 103. Such messages may include price information, such as the selling price or buying price of power.

Parking Lot Use

A user of the parking lot parks his or her vehicle in a parking space, for example, and if the vehicle needs to be charged, or if the user will provide his or her own vehicle for the VPP, he or she connects the vehicle to the charging station 111 with a power cable. Information pertaining to the use while parking is then input through the user terminal 102. The input user information is saved in the management server 101 and used for various processes, which will be described later. The input user information includes, for example, a user ID, a planned exit period (date/time), whether or not the power source unit can be used as a VPP power source (this will be called "VPP use of the power source unit" hereinafter), whether or not the vehicle can be shared during the parked period, and so on. Once this information is input, the period (date/time) when the vehicle entered is also automatically input from a real-time timer. When a user permits the use of VPP while his or her vehicle is parked, power is provided from the onboard power source unit to the grid. Furthermore, if the user has permitted the vehicle to be shared while parked (called "car sharing"), the user provides that vehicle to a user of the car sharing as a rental vehicle. Here, "car sharing" refers to a situation where a user who is not the owner of the vehicle uses the vehicle, and it is desirable that a vehicle provided for car sharing be registered in advance having undergone inspections as to whether or not the vehicle is suitable for car sharing, such as, for example, the state of the vehicle itself, whether or not the vehicle is insured, and so on. Of course, a vehicle is not provided for car sharing immediately simply because it has been registered, and whether or not car sharing is permitted is set each time the vehicle is parked. In the present embodiment, if a vehicle provided for VPP or car sharing is an electric automobile, the vehicle is fully charged, or is charged to an extent sufficient for the vehicle to travel the planned distance, before the vehicle exits. If the vehicle operates on fuel, in the present embodiment, the user, a person in charge, or the like refills the fuel as necessary. The configuration of and processing carried out by the management server 101, which enables a vehicle to be used in this manner, will be described next with reference to FIG. 2 to FIG. 9. With the parking lot according to the present embodiment, surplus power generated from the grid is received on the vehicle side, whereas when there is insufficient power, charging is throttled or power is supplied from the vehicle back to the grid. As such, if the surplus power is consumed by travel during car sharing, the power reception capacity of the power storage unit of that vehicle will increase, and thus more surplus power can be received. In this manner, car sharing contributes to the promotion of grid power leveling.

Management Server

Figure 2:
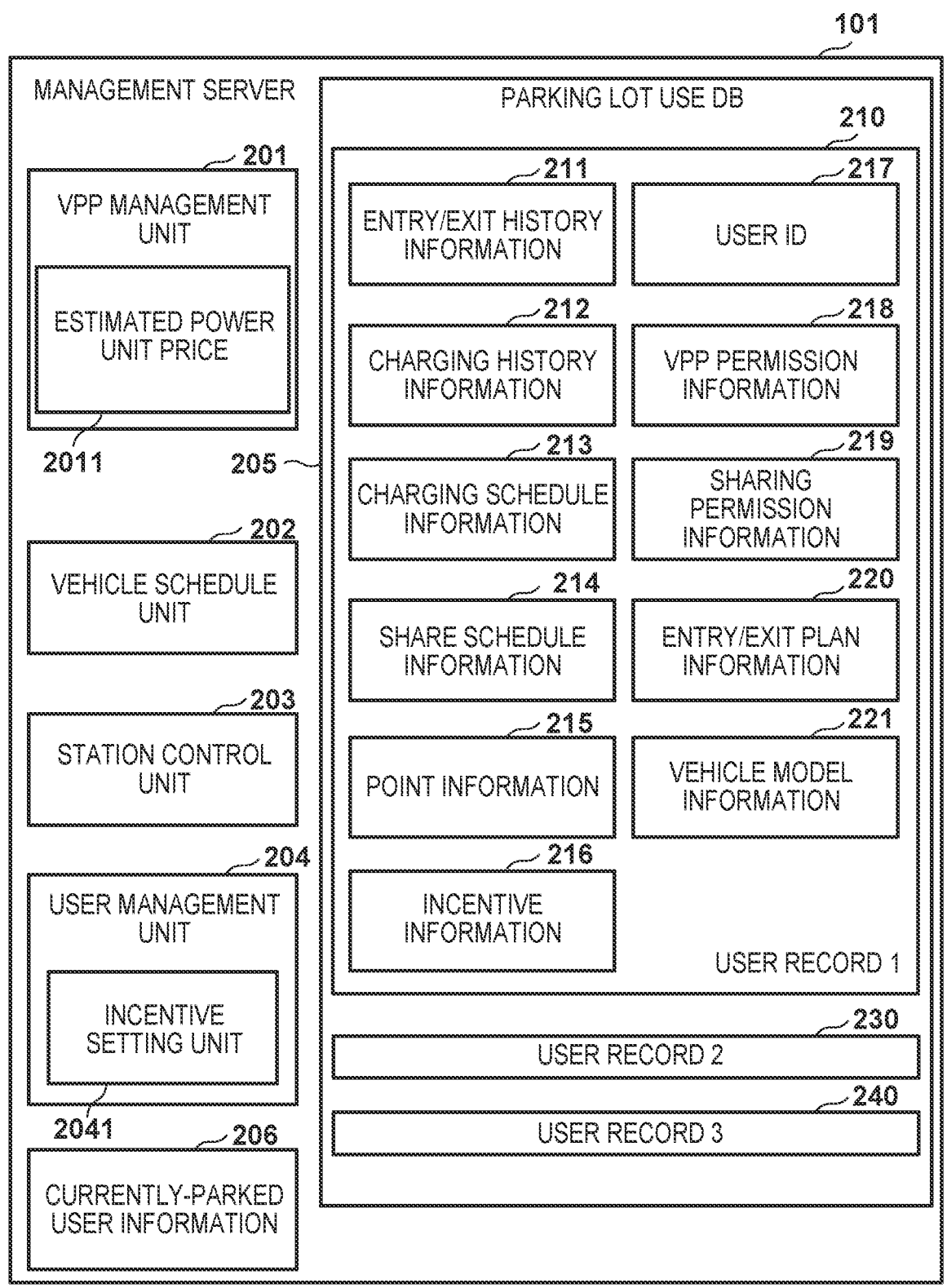
FIG. 2 is a function block diagram illustrating a management server.

FIG. 2 is a function block diagram of the management server 101. Each block corresponds to a function implemented by the management server 101, and those functions are implemented as per the flowcharts in FIG. 4A and on. Each function is implemented by a computer, which has a typical hardware configuration such as that illustrated in FIG. 3, executing programs having the sequences illustrated in the flowcharts in FIG. 4A and on.

In FIG. 2, a VPP management unit 201 determines a charging and discharging schedule of the onboard power source unit 1121, and controls the implementation of that schedule. In this example, the charging/discharging of the power source unit 1121 is controlled by sending instructions for charging, discharging, and so on to the vehicle 112 via the charging station 111 according to the schedule. The VPP management unit 201 holds an estimated power unit price 2011, and updates the value thereof as necessary. Note that if a message received from the grid for demand response includes price information, the estimated power unit price 2011 is updated with that price information at a timing at which the price is set. At this time, if the message also includes an applicable period of that price information, the applicable period is saved in the estimated power unit price 2011 in association with the price information. Although the estimated power unit price is mentioned here, the power unit price at the current point in time is used once the applicable period has been exceeded. The power unit price includes a selling price and a buying price. If, for example, the price is fixed for a relatively long period, an operator may update the price manually. Furthermore, if the price fluctuates depending on the time period, the day of the week, the date (or season), or the like, the price and the period for which the price is applicable may be registered in advance as the estimated power unit price.

A vehicle schedule unit 202 determines a car sharing schedule according to a planned entry or actual entry of the vehicle, the planned exit period, a car sharing reservation, and so on. The schedule which has been determined is adjusted in accordance with actual use. A station control unit 203 controls the charging, discharging, and so on of the vehicle via the charging station 111, the hydrogen station 121, or both. A user management unit 204 manages user information. The user management unit 204 includes an incentive setting unit 2041, and the incentive setting unit 2041 sets an incentive to provide to a user, and provides the incentive. Note that in the present embodiment, the "incentive" is a payment provided to a user associated with the vehicle in a parking lot use database (DB) 205, which will be described later, and in this example, is also referred to as "payment points", which are points having a monetary value. The user can pay parking fees, charging fees, fuel fees, and the like with this incentive. "User" refers to the user of the vehicle, and is assumed to be a person having authority over the use of the vehicle, e.g., the vehicle owner. A person using car sharing will be referred to as a "share user" to distinguish that person from the aforementioned user.

The management server 101 holds the parking lot use database (DB) 205 and currently-parked user information 206. In the currently-parked user information 206, the user ID of a user currently parked is recorded in association with identification information of the parking space, charging station, or hydrogen station where that user's vehicle is currently parked. Although the parking lot use database (DB) 205 may be managed by a computer different from the management server 101, that database is held in the management server 101 in this example. The parking lot use DB 205 contains user records 210, 230, 240, and the like, for each user. The following fields are included in each user record.

Entry/exit history information 211 stores a history indicating the periods when the vehicle entered and exited the parking lot. However, in this example, if a vehicle exits the parking lot, past records will not be referenced, and thus the records may hold only the periods for which the currently-parked vehicles are parked. Charging history information 212 stores a history of charging of the onboard power source unit 1121. The charging history includes, for example, a charging mode (a normal mode or a high-speed mode), a charging start period (a date/time or the like) and a charging end period or a charging time, a charging amount, and so on. Charging schedule information 213 holds a charging schedule for the parked electric automobile 112, a discharging schedule for when power is provided for the VPP, and so on. Share schedule information 214 holds a schedule for share use when the user has permitted car sharing. Point information 215 holds points based on parking lot usage, points awarded in response to providing the vehicle for VPP or car sharing, and so on. Incentive information 216 holds incentives awarded to the user on the basis of points. This does not particularly need to be recorded if the points themselves are used as incentives.

A user ID 217 is identification information unique to each user. VPP permission information 218 is information input when the user enters the parking lot, and records whether or not the vehicle is permitted to be provided for VPP use. Share permission information 219 is information input when the user enters the parking lot, and holds information indicating whether or not the vehicle is permitted to be provided for car sharing, and if so, the period for which the vehicle may be provided for car sharing. Entry/exit plan information 220 is input when the user enters the parking lot, and holds the planned exit period as well as a post-exit travel distance. If not input, information indicating that there is no input is recorded. For a user who has reserved use of the parking lot, the next planned entry period is recorded as well. When a reservation is made, for example, the user may input the planned entry/exit periods and so on from an information terminal he or she possesses, which may then be sent and recorded in the management server 101 through communication. Vehicle model information 221 holds the user's vehicle model. It is desirable that the user ID 217 and the vehicle model information be registered in the management server 101 by the user prior to using the parking lot, and that the information be recorded when creating a new user record. The type of driving source can be identified, e.g., whether the vehicle is an electric automobile, on the basis of the vehicle model information, and if the vehicle is an electric automobile, the capacity of the battery, e.g., the amount of time required to fully charge the battery, can also be identified on the basis of the vehicle model information.

Figure 3:
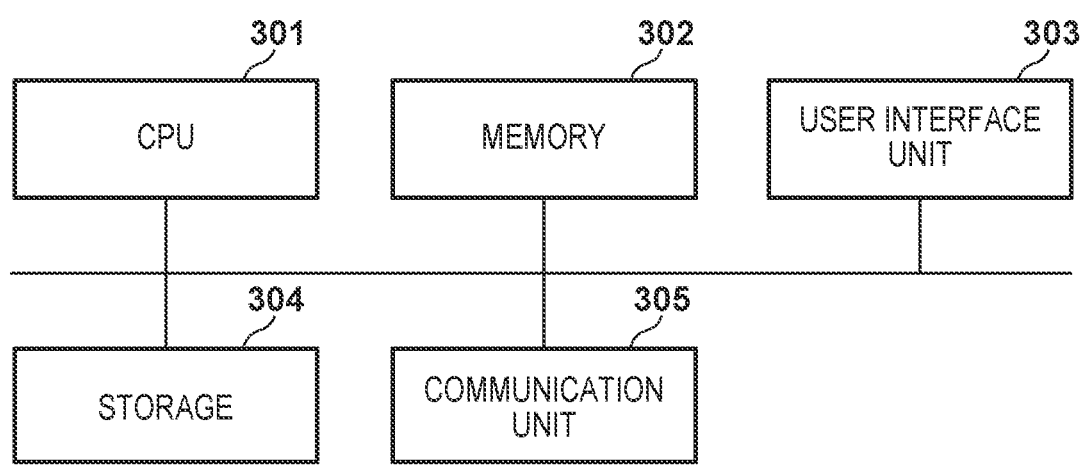
FIG. 3 is a hardware block diagram illustrating the management server and a user terminal.

FIG. 3 illustrates the hardware configuration of the management server 101. The management server 101 is configured as a typical computer, with a CPU 301 implementing various types of functions such as the flow from FIG. 4A and on by executing programs loaded from storage 304 into memory 302. The function blocks illustrated in FIG. 2 are realized as a result. At this time, information is input and output by a user interface unit 303, which includes a keyboard, a display, and the like, and the server communicates with the network 103 through a communication unit 305. Although the configurations of the user terminal 102 and the charging station 111 are not shown, both have configurations for information processing similar to that illustrated in FIG. 3. The charging station 111 may function as a terminal for the user of the parking lot to input a usage start time, for example. In addition to a configuration for traveling, the vehicle 112 also has the configuration illustrated in FIG. 3, which controls the driving of various parts of the vehicle. Of the processing executed by the management server 101, the processing according to the invention of the present embodiment will be described hereinafter with reference to flowcharts.

Entry Process

Figure 4A:
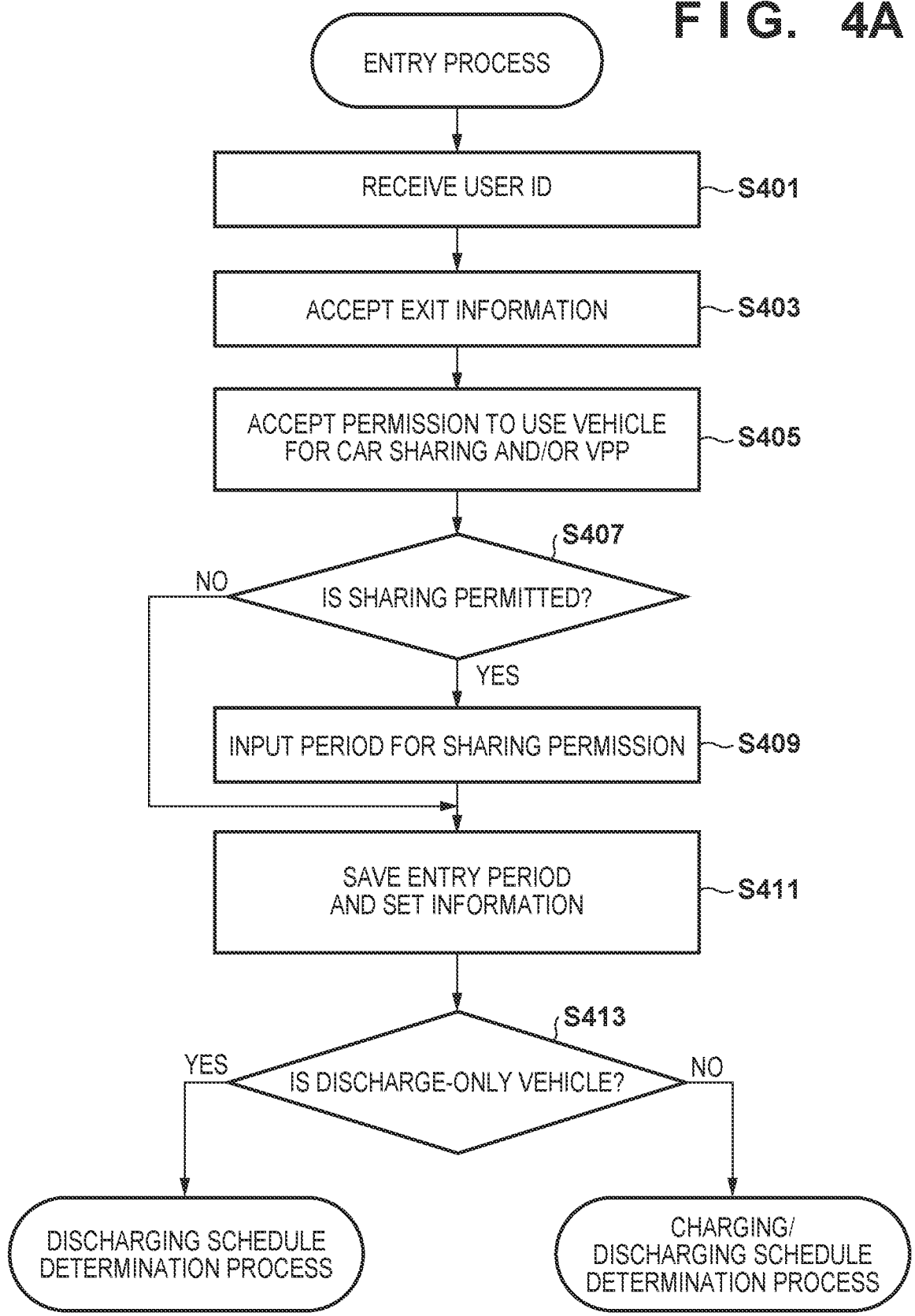
FIG. 4A is a flowchart illustrating a vehicle entry process and exit process carried out by the management server.
Figure 4B:
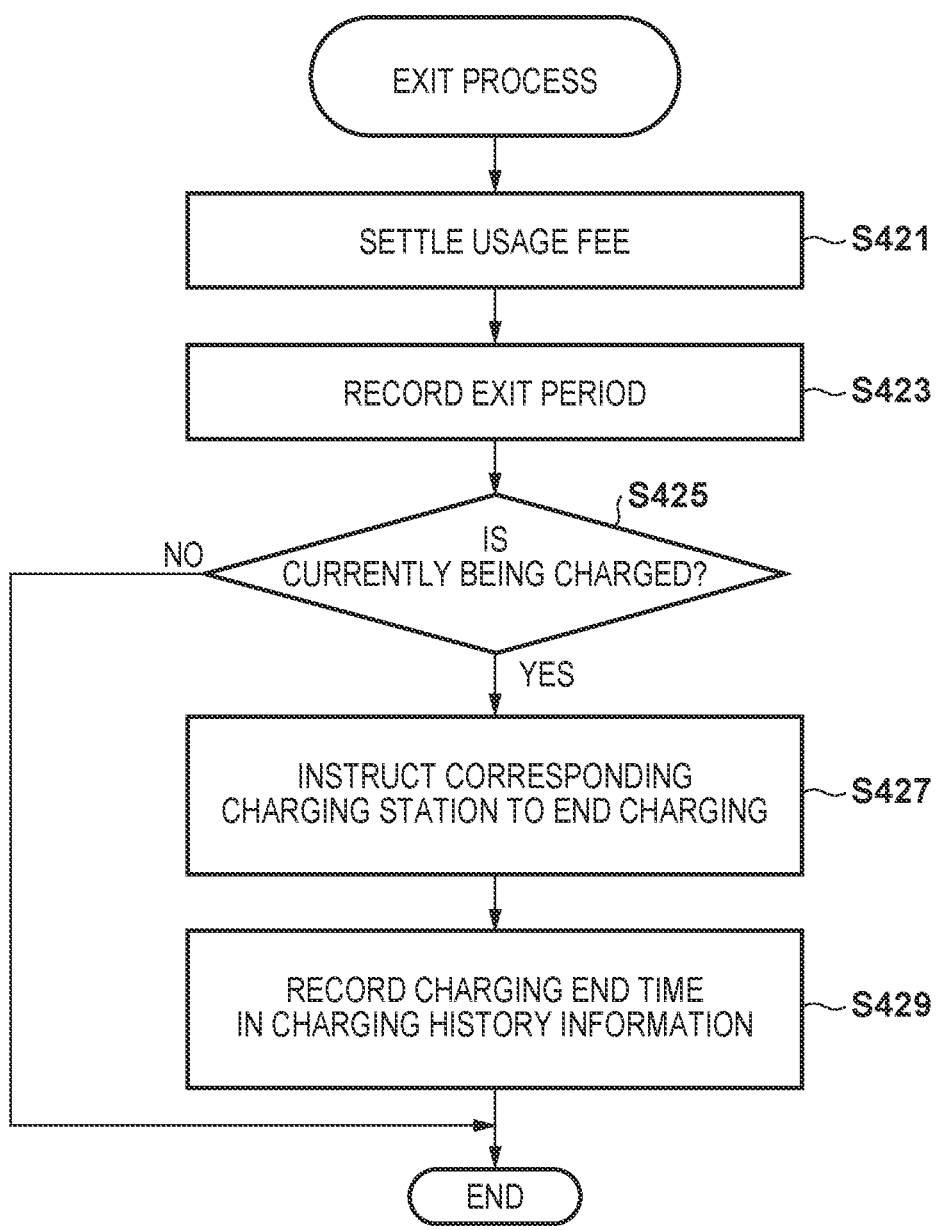
FIG. 4B is a flowchart illustrating a vehicle entry process and exit process carried out by the management server.

FIG. 4A illustrates a sequence carried out when the user uses the parking lot of the vehicle management system illustrated in FIG. 1. Note that parking a vehicle in the parking lot is referred to as "entry", and driving the vehicle out of the parking lot is referred to as "exit". Additionally, FIGS. 4A and 4B are sequences for a vehicle capable of supplying power to the exterior. A different entry sequence is carried out for a vehicle including only an internal combustion engine as a power source, a vehicle provided with a storage battery that cannot be charged from the exterior, and so on, for example. The user who has entered the parking lot with a vehicle inputs his or her own user ID from the user terminal 102 provided at an entrance gate, for example, from the charging station 111, or the like. To that end, the user terminal 102, the charging station 111, and so on display a user interface and accept the input. This process is not limited to the user ID, and is the same for other information input from the terminal. The information input through the terminal is sent to the management server 101 over the communication network 103, and the management server 101 receives that information. The same applies to other information as well.

Once the user ID which has been sent is received (S401), the user ID is recorded in the currently-parked user information 206, and a user record is specified using that user ID as a keyword. An error is returned if there is no corresponding user record, and the user or an administrator is prompted to re-input the information or carry out a procedure for registering a new user record. Here, a user having a corresponding user record will be called a "user of interest", and that user record will be called a "user record of interest". Next, exit information is received and accepted (S403). The exit information is planned exit information, and includes the exit period (date/time), and post-exit travel such as a destination, a route, and so on. Alternatively, the information may be a post-exit planned travel distance. There are also cases where the exit information is not input. Next, permission to use the vehicle for car sharing or VPP is accepted. It is determined whether car sharing is permitted (S407), and if car sharing is permitted, a period for which the vehicle is to be provided for sharing, or a period for which the vehicle is not to be provided for sharing, is accepted as well (S409). If no period is specified, sharing is assumed to be permitted for the entire period the vehicle is parked. Although the designation of a period for which the vehicle is used for VPP is not accepted in the present embodiment, such a designation may be accepted in the same manner as with car sharing.

Then, in step S411, the various types of information which have been input are saved in the user record of interest along with the entry period (S411). If the parking lot is rented on an hourly basis, a ticket machine into which the user terminal 102 is incorporated may be driven to issue a parking ticket. Here, the exit information is stored in the entry/exit plan information 220; whether or not car sharing is permitted, and the period thereof, are stored in the share permission information 219; and whether or not the vehicle can be used for VPP is stored in the VPP permission information 218. The entry period is recorded in the entry/exit history information. It is then determined whether the entering vehicle is a vehicle having a storage battery which is charged from an external power source, or is a vehicle capable only of discharging, such as a fuel cell or series hybrid vehicle (S413). As described above, vehicles which cannot provide power to the exterior are excluded from this processing. If it is determined that the vehicle has a function for being charged from an external power source, the process branches to a charging/discharging schedule determination process, illustrated in FIG. 5. On the other hand, if the vehicle does not have a function for being charged from an external power source, the process branches to a discharging schedule determination process, illustrated in FIG. 6B. Although not illustrated, in addition to the information input when the vehicle actually entered the parking lot, the entry information includes planned entry information indicating periods of a planned entry and a planned exit. This planned entry information may be the same as the information input when the vehicle actually enters. However, because the vehicle is not actually present, the planned entry information is overwritten by the entry information input when the vehicle actually enters, and the schedules for charging, discharging, and so on are then determined again. With respect to sharing, a reservation for using the sharing may be accepted on the basis of part of the planned entry information which can be trusted. This will be described later. Whether an entry is a planned entry or an actual entry may be identified by providing a flag or the like, for example.

Exit Process

When exiting, the user carries out an exit procedure. The exit process illustrated in FIG. 4B is started by, for example, inputting an identification number of the parking space the user is exiting, or having a parking ticket read. First, a usage fee is settled (S421). The parking fee is paid in cash, by credit card, using a token, or the like, and thus a terminal for that purpose (not shown) is prepared in the parking lot. The fee is settled using that terminal. However, if the parking lot is used on a regular basis, such as on a monthly basis, the process of step S421 is not necessary. Next, the period, e.g., the date/time, of the actual exit is read from a real-time clock and used in the entry/exit history information 211 (S423). In step S423, the user ID of the exiting user is deleted from the currently-parked user information 206. It is then determined whether or not the vehicle is currently being charged from an external power source. Although charging is carried out according to a schedule set based on a predetermined exit period, a situation is possible where the actual exit period comes before the planned exit period, or the charging has taken longer than planned and the vehicle is still being charged at the time when the vehicle is to exit. If the vehicle is being charged, a charging end instruction is sent to the charging station where the vehicle which is to exit is being charged (S427). Then, the charging end period (time) is recorded in the charging history information 212 (S429). The charge amount may also be recorded. However, the process ends if the vehicle is not being charged. Note that the charging can also be terminated by removing the power cable from the vehicle, in which case steps S425 and on of the exit process need not be carried out. In this case, the management server 101 may receive a notification indicating that the charging has ended from the charging station 111 or the vehicle that had been charging, and the processing of step S427 and step S429 may then be carried out in response to that notification. Note that the entry process and the exit process are carried out by the user management unit 204 illustrated in FIG. 2.

Charging/Discharging Schedule Determination Process

Figure 5:
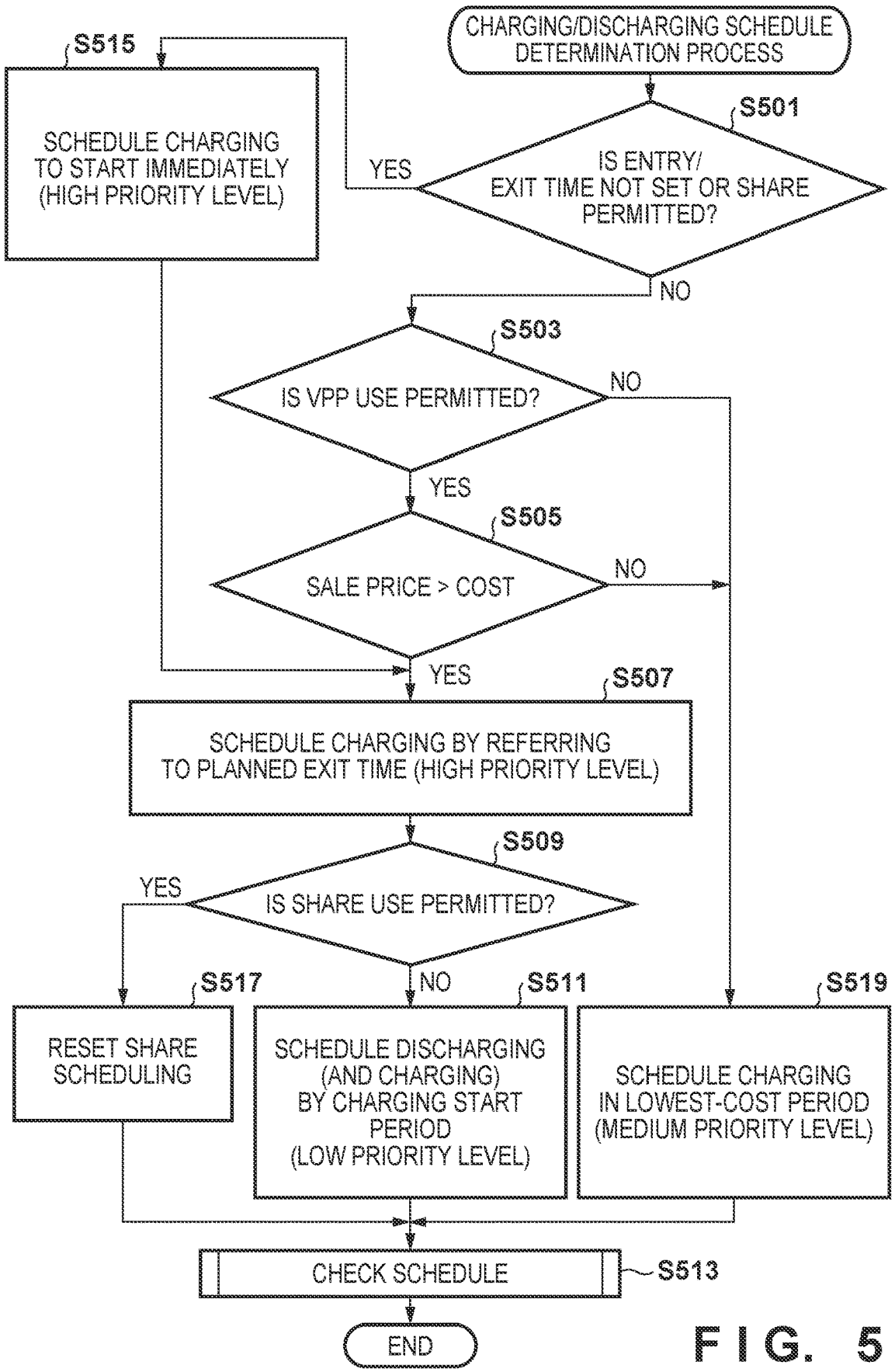
FIG. 5 is a flowchart illustrating a discharging/charging schedule determination process carried out by the management server.
Figure 6A:
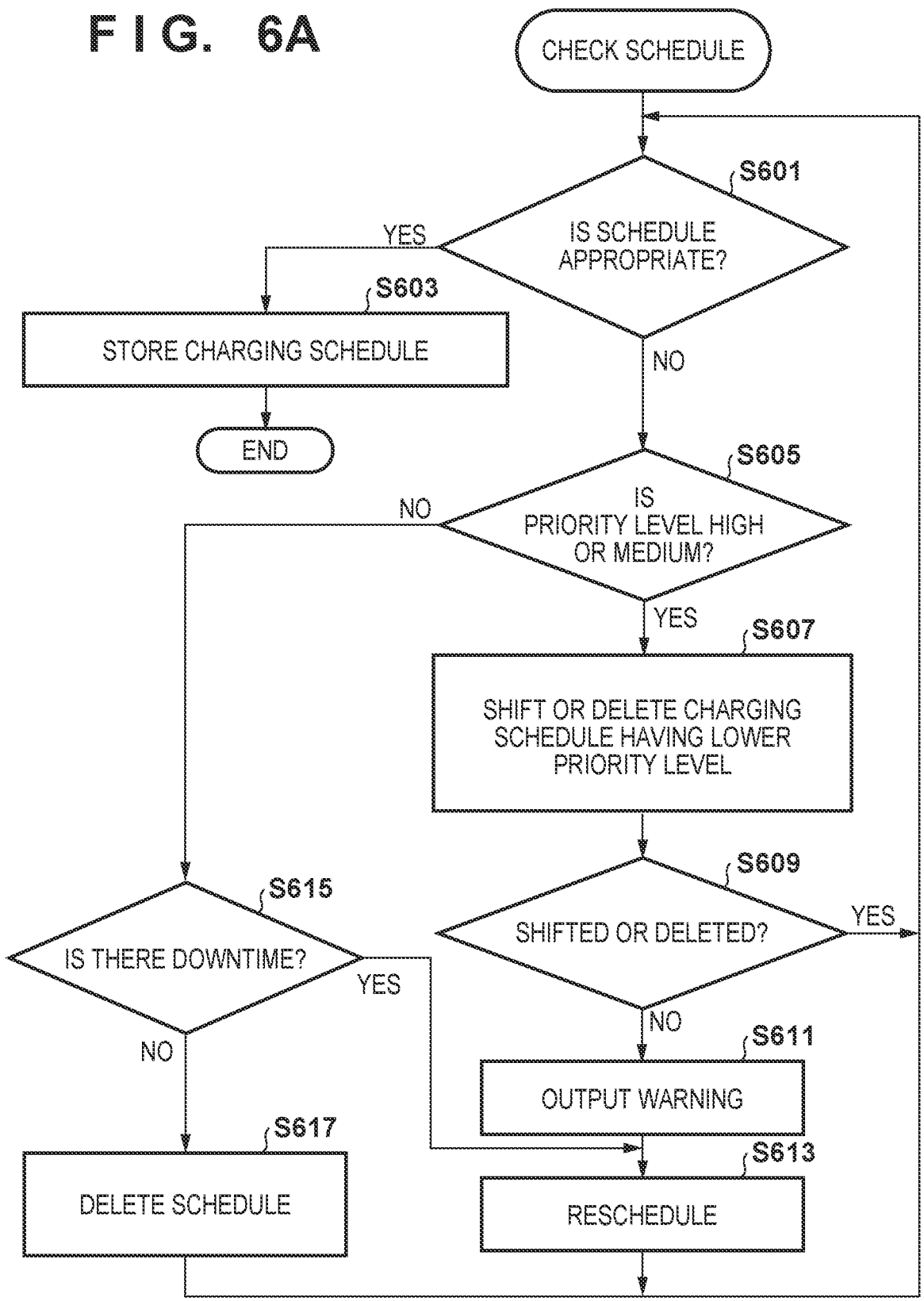
FIG. 6A is a flowchart illustrating a discharging/charging schedule determination process carried out by the management server.
Figure 6B:
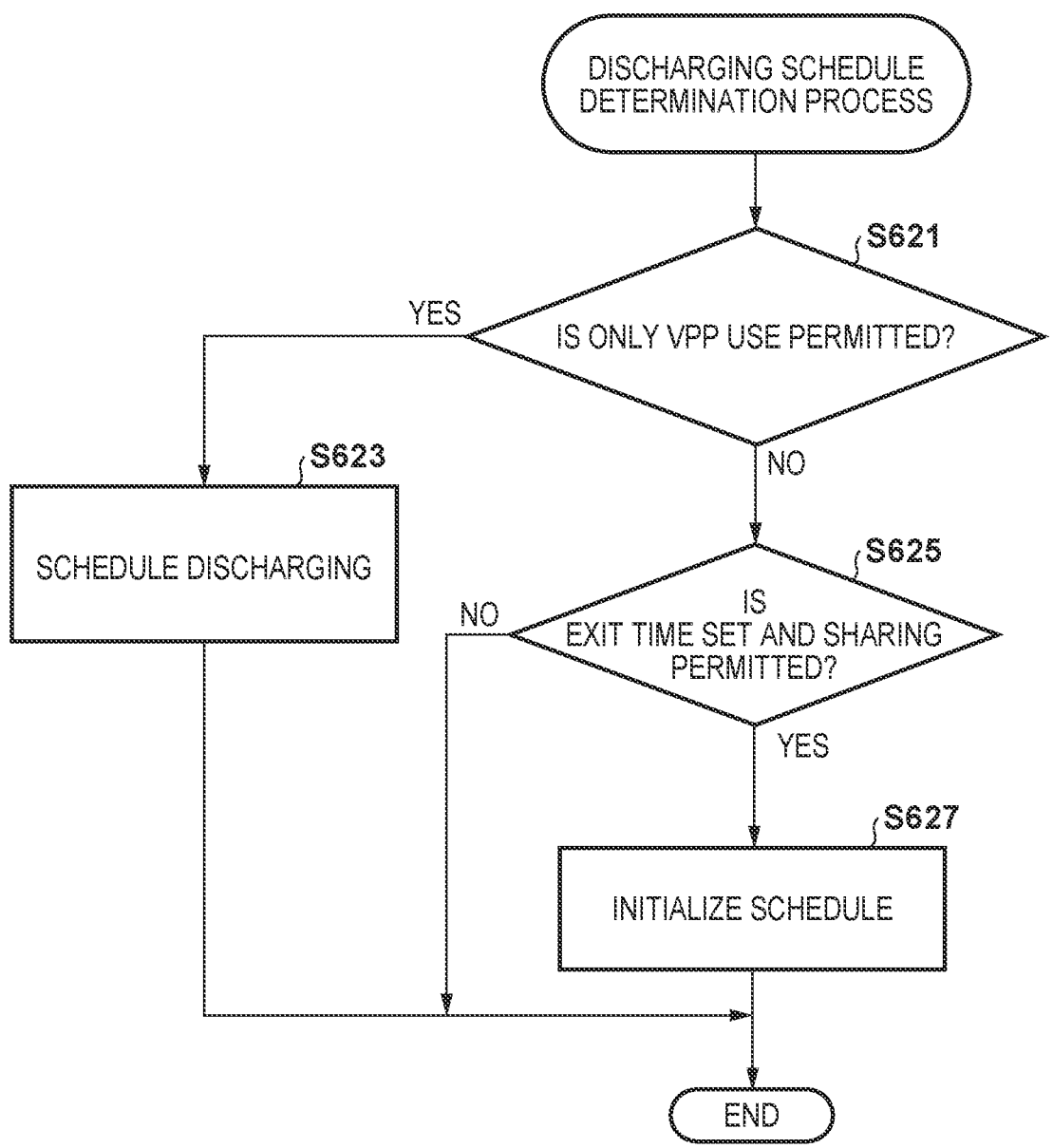
FIG. 6B is a flowchart illustrating a discharging/charging schedule determination process carried out by the management server.

FIG. 5 illustrates a charging and discharging schedule determination process carried out when, in step S413, the vehicle has been determined to include a power unit that can be charged from the exterior of the vehicle and that can discharge to the exterior. The processes illustrated in FIGS. 5, 6A, and 6B are executed by the VPP management unit 201. First, it is determined whether the planned exit time is recorded, or if car sharing is permitted, by referring to the entry/exit plan information 220 and the share permission information 219 (S501). If the exit time is not set, it is not known when the vehicle will exit, whereas if car sharing is permitted, the vehicle may be rented out, and thus scheduling is carried out to start charging immediately (S515). At this time, the time required for charging is estimated, and an estimated charge ending time is included in the schedule. If there is conflict amongst charging schedules, the charging carried out in step S515 is given the highest level of priority. The determined schedule and the level of priority are recorded in the charging schedule information 213.

On the other hand, if the planned exit time is recorded and car sharing is not permitted, it is determined whether VPP is permitted (i.e., whether the user's agreement has been obtained) by referring to the VPP permission information 218 (S503). If VPP is permitted, the selling price (sale price) of power from the vehicle to the power grid and the buying price (cost) of power from the power grid to the vehicle are referred to by referring to the estimated power unit price 2011, and it is determined whether or not the sale price is higher than the cost (S505). Note that in the present embodiment, whether power is to be bought or sold is specified using the vehicle or the parking lot as a reference. For example, if the vehicle is to be charged using grid power, power is being purchased, and the price thereof is called the "buying price" or the "cost". However, if power is being supplied, or in other words, sold, from the vehicle to the power grid, then power is being sold, and the price thereof is called the "selling price" or the "sale price". The process branches to step S513 if the sale price is determined to be less than or equal to the cost. On the other hand, if the sale price is determined to be higher, the charging is scheduled by referring to the planned exit period (S507). In this case, the charging start period is determined so that, for example, the battery will go from a substantially empty state to a full charge by the planned exit time. The priority level of this charging schedule is set to the highest priority level. Next, it is determined whether the vehicle is permitted to be provided for sharing by referring to the sharing permission information (S509). If using the vehicle for sharing is not permitted, discharging is scheduled for downtime leading up to the start of charging (S511). If, after the discharge, there is time before the start of the final charge based on the planned exit time, charging and discharging may be scheduled to be carried out repeatedly. If the buying price fluctuates over time, whether or not to schedule the selling of power is determined by comparing the sale price and the cost according to the price at that time. Note that the priority level of the charging schedule for VPP in step S511 is the lowest. The determined charging schedule is stored in the charging schedule information 213. It is then checked whether or not that schedule is appropriate (S513). The schedule being appropriate refers to whether the schedule adheres to a given restriction, for example. For example, if there is an upper limit to the electrical current contracted for the parking lot as a whole, charging exceeding that current cannot be carried out. Whether the schedule adheres to that restriction is then checked, and if the schedule does not adhere, the scheduling is adjusted. This is illustrated in detail in FIG. 6A.

Although the buying price and selling price are simply compared in step S505, the process may branch in accordance with a result of comparing a reference buying price and a buying price at the point in time when the power is bought. For example, it is conceivable that if there is insufficient power on the grid side, the grid side will attempt to reduce demand by raising the price at which electricity is sold beyond the normal price (the "sale price" in FIG. 5), whereas if there is excess power, the grid side will conversely reduce the price beyond the normal price. On the other hand, with respect to the selling price for selling power to the grid, the grid requires more power when power is insufficient, which increases the sale price, whereas the grid requires less power when there is excess power, which reduces the sale price. Accordingly, an average buying price over a given past period from the current point in time may be taken as a reference buying price, and in step S505, that reference price may be compared with an estimated buying price at the point in time when the vehicle can be charged. If the buying price at the current point in time is higher, it is likely that the selling price is lower than the buying price, and thus the process branches to step S519. If such is not the case, it is likely that the selling price is higher than the buying price, and thus the process branches to step S507. In this manner, in step S505, it is determined whether or not selling power will be profitable, or whether or not such a situation is likely. If selling power will be profitable, or if such a situation is likely, power is scheduled to be sold from the onboard battery.

On the other hand, if in step S503 it has been determined that VPP use is not permitted, or if in step S505 it is determined that the sale price is less than or equal to the cost, the charging schedule is determined so that charging is carried out in the lowest-cost period within a possible range, i.e., during a period where the buying price of power is the lowest (S519). Of course, there are time restrictions, such as the planned charging end period being before the planned exit period. This charging schedule is given a medium level of priority. The determined charging schedule is stored in the charging schedule information 213. It is then checked whether the determined schedule is appropriate (S513). Note that if planned selling prices are determined in advance for different time periods, for example, the electricity price level can be determined by referring to those prices. Furthermore, if the price information included in a message for demand response has been updated using the planned selling price, the electricity price level can be determined by referring to an applicable time associated with the price information. In step S519, charging is scheduled for the period, among the periods in which the vehicle can be charged, where the price of electricity is the lowest.

If it is determined in step S509 that car sharing is permitted, the share scheduling is reset (S517). The resetting of the share scheduling is set so that, for example, the charging end period scheduled in step S515 is taken as a sharing start period, and the charging start period scheduled in step S507 is taken as a sharing end period. If there is no downtime during this period, the charging schedule set in step S507 may be deleted. Additionally, if shared use is permitted, the schedule may be determined so that charging is carried out to approximately 80% in both steps S515 and S507, in order to secure downtime. The charging and discharging schedules are determined through the procedure described thus far.

FIG. 6A illustrates the schedule checking process carried out in step S513. First, in step S601, it is determined whether the schedule which has been determined is appropriate. As described above, the schedule being appropriate refers to whether the schedule adheres to a given restriction, for example. For example, all of the users currently parked are identified using the currently-parked user information 206, and the charging schedule information 213 of those users is obtained. Then, referring to those charging schedules, it is determined whether the electrical current consumed by charging those vehicles in parallel will exceed, for example, a contracted upper limit, and if that consumption does not exceed the upper limit, the schedule can be determined to be appropriate. Of course, this is merely an example, and the appropriateness may be determined according to another restriction instead.

If the schedule is appropriate, that charging schedule is stored as-is (S603). If no rescheduling is to be carried out, the processing may end without step S603 being carried out. If the schedule is not appropriate, it is determined whether or not the priority level of the determined schedule is high or medium (i.e., is not the lowest) (S605), and if the priority level is high or medium, a schedule having a lower priority level is shifted to another period of downtime (S607). "Downtime" is a time period in which there is excess time for scheduling charging, and is a time period in which, for example, charging can be scheduled without going against the aforementioned predetermined restrictions. Note that when the priority level of the schedule to be shifted is the lowest but downtime to which that schedule can be shifted cannot be secured, the schedule may be deleted instead. Additionally, if the priority level of the schedule to be shifted is medium and the schedule is to be set again in accordance with the exit time, it is necessary to re-set the priority level to the highest priority level (this is the same as in step S507).

Next, it is determined whether or not an existing, lower-priority schedule has been successfully shifted or deleted (S609). The process branches to step S601 if the schedule has been successfully shifted or deleted. Note that if schedules continue to be shifted in an alternating manner between two time periods, for example, there is a risk that the loop from step S601 to YES in step S609 will be repeated. As such, if the schedule of one vehicle has been shifted, it is desirable to mark the time period to which the schedule has been shifted so as to prevent such a loop.

If it has been determined in step S609 that the lower-priority schedule could be neither shifted nor deleted, it may be necessary to schedule the charging so that the end of the charging comes after the planned exit period. Accordingly, a warning to that effect is output as a display or the like (S611), and the charging is rescheduled so that the charging schedule is not restricted by the planned exit time (S613). The process then branches to step S601. Note that the determined charging schedule is stored in the charging schedule information 213.

If it has been determined in step S605 that the priority level of the charging schedule currently set is the low priority level, it is determined whether there is a downtime period to which that schedule can be shifted (S615). If there is no such downtime period, the charging schedule is deleted, and the process branches to step S601. If there is such a downtime period, the charging is rescheduled using that downtime period (S613). The scheduling can be made appropriate through the sequence described thus far. Although the foregoing describes an example in which an upper limit value of the electrical current is used as a restriction, the restriction may instead be the number of charging stations or the like, for example.

Discharging Schedule Determination Process

FIG. 6B illustrates processing for determining a discharging schedule when it has been determined in step S413 that the vehicle cannot be charged, and is capable only of discharging. "Discharging" is carried out in order to discharge electricity from an internal combustion power generator or a fuel cell and sell that electricity to the grid. First, it is determined whether the vehicle is permitted to be used for VPP (S621). If VPP is permitted, the discharging schedule is determined (S623). Even in this case, the electricity cost may be compared with the sale price, and the discharging scheduling may be foregone if the cost is higher. The cost may be the price of hydrogen, fuel, or the like used to generate electricity. Furthermore, a discharging end time need not be set. The vehicle stops discharging once the fuel has been used up, and thus the vehicle may discharge up until that point. On the other hand, if VPP is not permitted or if car sharing is permitted, it is determined whether a planned exit time is set and whether car sharing is permitted (S625). If a planned exit period is set and sharing is permitted, an initial sharing schedule is set (S627). This is the same as in step S517. In other words, the vehicle of interest is rented out in response to a use request from, for example, the current point in time to the planned exit period. If a determination of "no" has been made in step S625, the process ends as-is. Note that if fuel fees are charged to the user of the parking lot (e.g., the owner of the vehicle) separate from the parking fee, the fuel is refilled before carrying out VPP or before providing a vehicle for sharing, and the user is then charged for that amount. For sharing, the cost of fuel which has been used is charged to the user of the vehicle, whereas for VPP, the vehicle is refilled with the amount of fuel used for VPP at the expense of the parking lot administrator. Of course, this is only an example, and another method can be used instead.

Execution of Charging/Discharging Schedule

Figure 7:
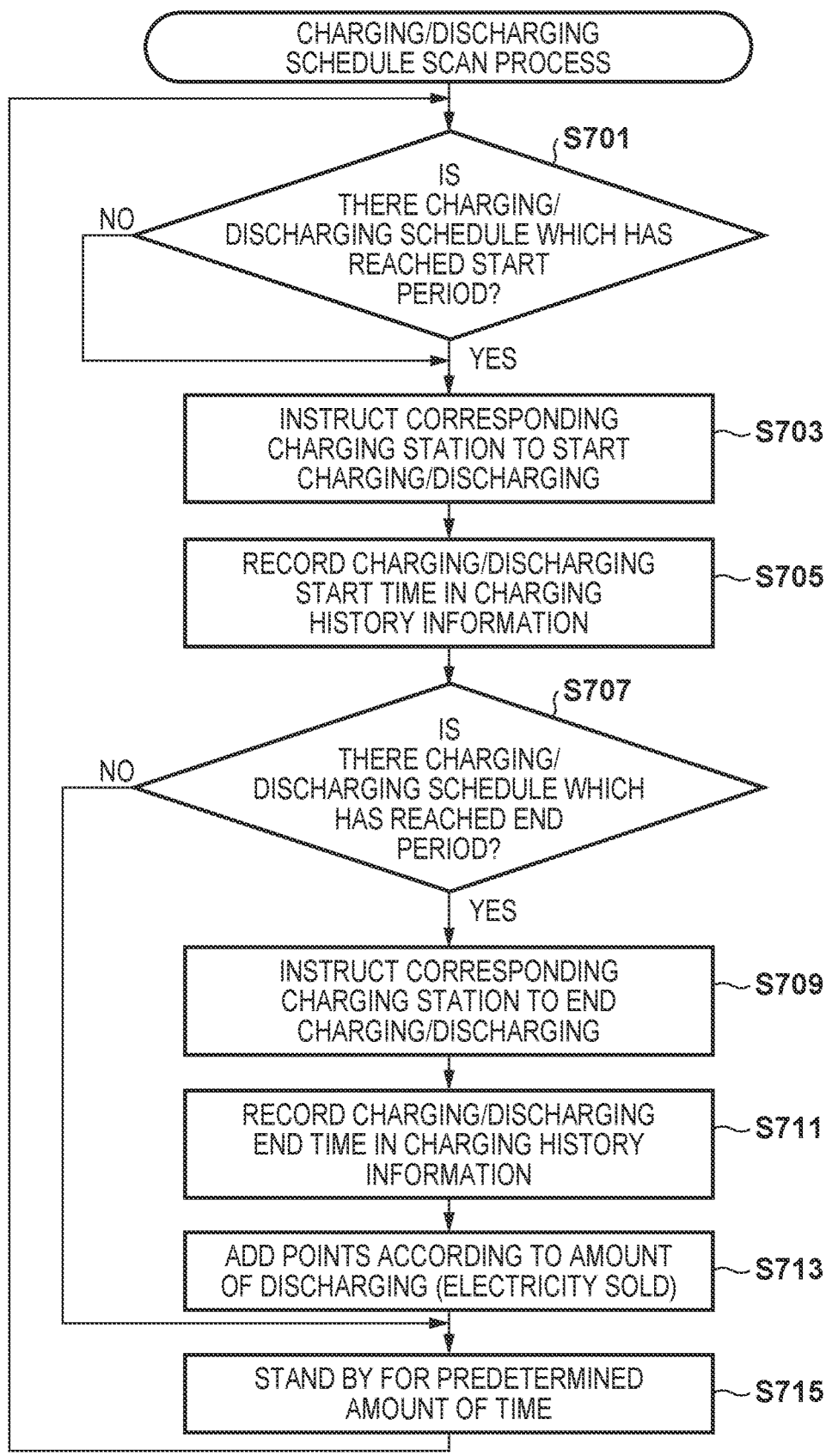
FIG. 7 is a flowchart illustrating discharging/charging according to a discharging/charging schedule from the management server.

The charging/discharging schedule set through the sequence illustrated in FIG. 5 and FIGS. 6A and 6B is executed according to the sequence illustrated in FIG. 7. The sequence of FIG. 7 corresponds to processing by the station control unit 203 illustrated in FIG. 2, for example. The management server 101 scans the charging/discharging schedule through the sequence illustrated in FIG. 7, and when a time at which a given operation is to be carried out is reached, the corresponding operation is executed. The schedule subject to scanning is the charging schedule information 213 in which is recorded a user record having the user ID recorded in the currently-parked user information 206. Note that the share schedule information 214, which is created through the sequence illustrated in FIG. 8(A), may be scanned through the sequence illustrated in FIG. 7 as well.

First, all of the schedules to be scanned are scanned in sequence, and it is determined whether or not there is a vehicle which, at the present time, has reached a charging or discharging start period (S701). If there is a schedule which has reached a charging or discharging start period, the charging station 111 to which the corresponding vehicle is connected is instructed to start charging or discharging (S703). When it is necessary to issue an instruction to the vehicle system, the instruction to start the charging or discharging is also sent to the connected vehicle 112 via the charging station 111. The start of the charging or discharging, and the time of that start, are then recorded in the charging history information 212 (S705). If the processing pertaining to the start of charging or discharging has ended, it is then determined whether or not there is a vehicle which has reached a charging or discharging end period (S707). If there is a schedule which has reached a charging or discharging end period, the charging station 111 to which the corresponding vehicle is connected is instructed to end charging or discharging (S709). When it is necessary to issue an instruction to the vehicle system, the instruction to end the charging or discharging is also sent to the connected vehicle 112 via the charging station 111. The end of the charging or discharging, and the time of that end, are then recorded in the charging history information 212 (S711). At this time, information pertaining to the schedule which has ended is deleted from the charging schedule information 212. Then, if the operation which has been carried out is the ending of discharging (i.e., selling electricity), points according to the value of the electricity sold, the amount of electricity, and so on are added to the point information 215 (S713). Once this processing has ended, or once the scanning has not found a schedule which has reached the end period, the process returns to step S701 after standing by for a predetermined amount of time. The charging or selling of electricity can be realized according to the schedule through these operations.

Share Schedule Reservations and Payment Processing

Figure 8A:
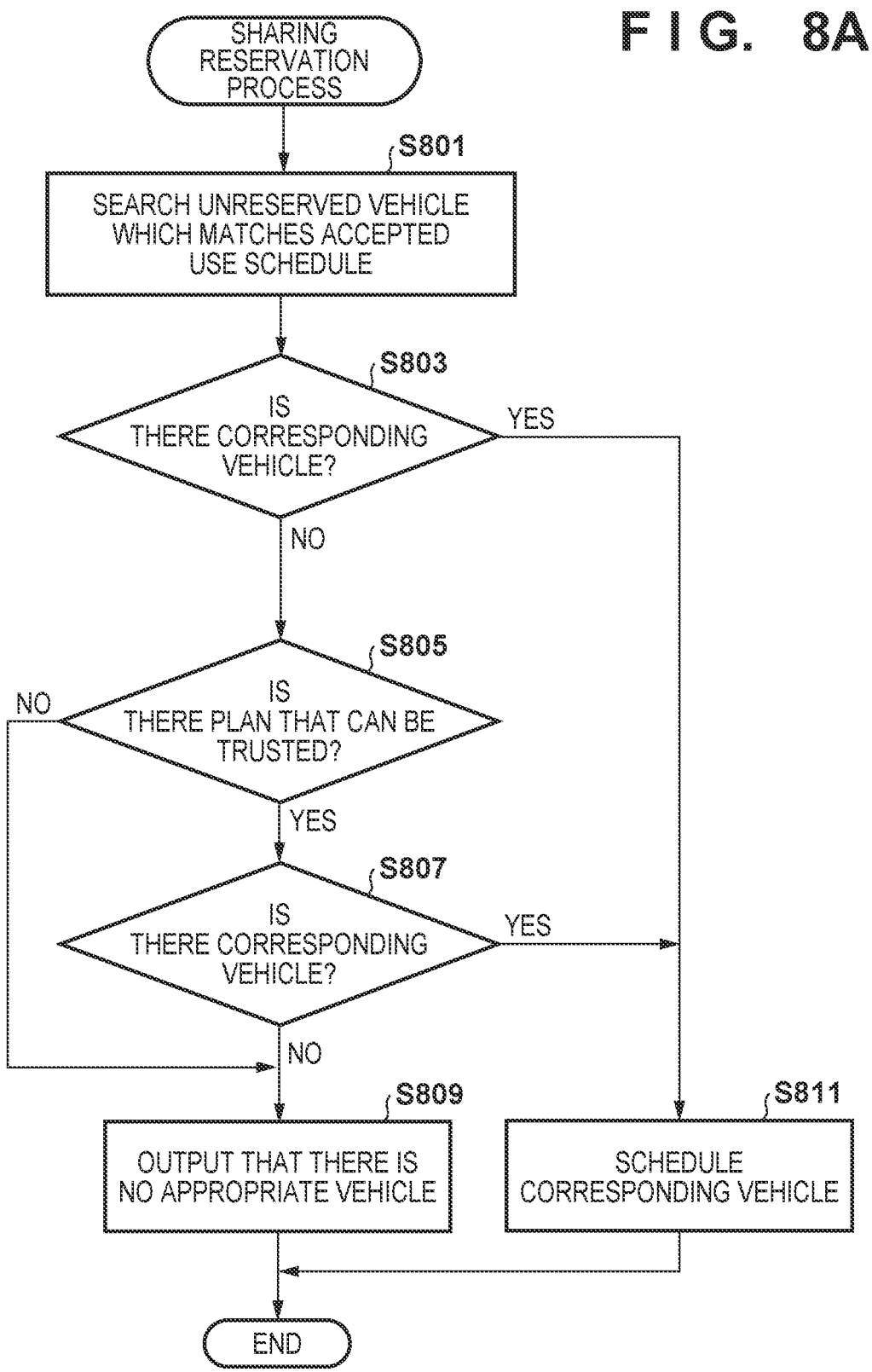
FIG. 8A is a flowchart illustrating a vehicle sharing procedure process carried out by the management server.

FIG. 8A illustrates a sequence of a car sharing reservation process. The sequences illustrated in FIGS. 8A and 8B correspond to processing carried out by the vehicle schedule unit 202 illustrated in FIG. 2. The management server 101 first accepts a reservation for sharing from the user terminal 102, over the Internet from an information terminal, or the like. To accept the reservation, for example, a configuration may be used in which predetermined HTML data or the like is prepared in the management server 101, and the user can input information for making a reservation by accessing that page. The user ID and a use schedule, for example, are included in the information which is input.

First, an available vehicle (an unreserved vehicle) which matches the use schedule that has been input is searched for by referring to the share schedule information 214 (S801), and it is determined whether or not there is a corresponding vehicle (S803). Vehicles that are actually parked are assumed to be subject to the search. If there is a corresponding vehicle, a rental period and a return period are recorded in the share schedule information 214 of that vehicle (S811). However, if there is no corresponding vehicle, a search is carried out for vehicles which are not actually parked, but for which there is a plan to park, and for which the owner has a set reliability level. It is thus determined whether or not such a vehicle plans to enter the parking lot (S805). For example, the reliability level is measured by using a schedule adherence incentive, which will be described with reference to FIG. 9, as a reference, with the owner determined to be reliable if greater than or equal to a predetermined value has been granted as that incentive. If there is a plan for a reliable vehicle to be parked, that plan is searched to determine whether there is a vehicle that matches (S807). If there is a vehicle that matches, that matching vehicle is scheduled in step S811. If there is no matching vehicle, an indication to that effect is output (S809), and the process ends. Because it is a burden to search through all of the users in step S805, unrealized planned entry information (information in which entry periods and exit periods are consolidated) may be prepared separately for the planned entry information, and that information may be searched instead.

Car Sharing Payment Process

Figure 8B:
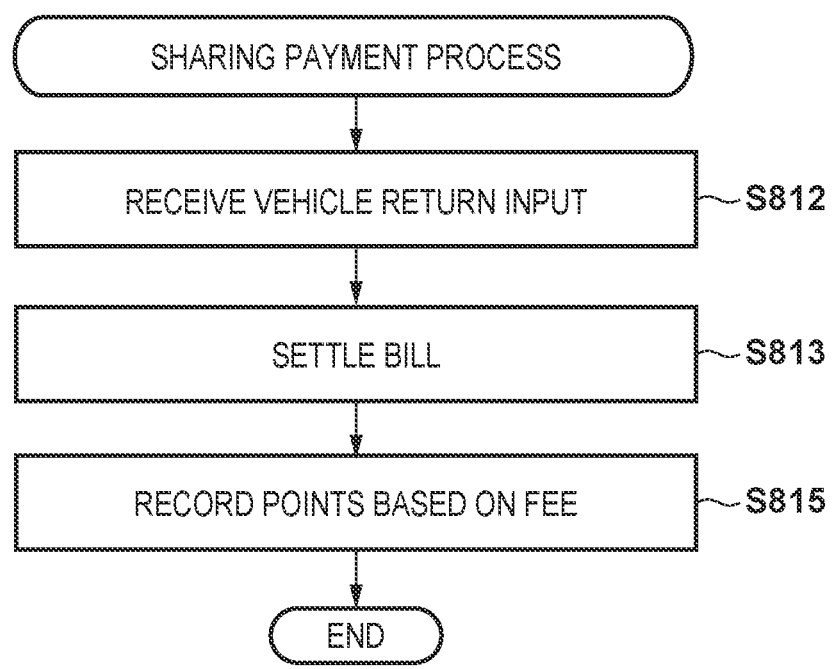
FIG. 8B is a flowchart illustrating a vehicle sharing procedure process carried out by the management server.

FIG. 8B illustrates a sequence of a car sharing payment process. This process is executed by the vehicle schedule unit 202, for example. When the user of car sharing returns the vehicle, the user inputs an indication to that effect through, for example, user terminal 102, an information terminal that user possesses, or the like. The management server 101 receives that input (S812), finalizes the sharing start period and end period, requests a fee based on that rental time, for example, accepts payment, and settles the bill (S813). Then, for example, points based on that fee are added to the point information 215 in the user record of the owner of the vehicle (S815). Note that the collected fee may be distributed to the owner of the vehicle, but descriptions thereof will be omitted here. In this manner, a user that provides a vehicle for car sharing can obtain points.

Incentive Processing

FIG. 9 illustrates a sequence for granting incentives to a user. This process is executed by the user management unit 204, for example, and by the incentive setting unit 2041 in particular. Furthermore, this process may be executed for all users periodically, e.g., once a month at a predetermined time on a predetermined day. First, a single user record is focused on to calculate an incentive on the basis of the point information 215 (S901). If the points are the same as the incentive, for example, this calculation need not be carried out, but if conversion is necessary, that conversion is carried out. The obtained incentive is stored in the incentive information 216 (S903). Then, if there is a reservation for entering or exiting, it is determined whether that plan matches an actual entry and exit (S905). For the closeness of the match, a predetermined time difference, such as approximately 0.5 hours, may be determined to be a match. If the result of the determination indicates a match, an incentive for adhering to the plan is additionally granted (S907). The incentive added in step S907 is added to the incentive information 216 in the same manner as the incentive granted in step S903, and is also held separately to be referred to when determining whether or not the owner is reliable in step S805. Then, in step S909, it is determined whether the incentive process has been carried out for all users, and if there is an unprocessed user, the process is carried out again from step S901 for that user.

The incentive may be granted as a discount from the parking fee, for example, or may be granted as additional points on a typical point card or the like. Additionally, although the present embodiment assumes that electricity fees for charging are included in the parking fee, if the electricity fees are charged separately, the incentive may be allocated to those electricity fees. The incentive added in step S907 is granted because when vehicles enter and exit according to the plan, reservations for sharing can be accepted on the basis of that plan, which is expected to increase the revenue received from sharing. This provides motivation for owners to provide their vehicles for sharing. Additionally, if the incentive in step S903 is provided so that a greater incentive is granted the more points there are, an incentive based on the amount of electricity sold can be granted to the user, which serves as a motivation for participating in VPP.

Furthermore, by increasing or adding incentives for users who park for a long time, users can be encouraged to park for longer periods. This makes it possible to supply power in a more systematic manner. Furthermore, with respect to granting incentives, it is preferable to know entry plans, exit plans, and so on as quickly as possible, and for parked periods to be longer, for the purpose of scheduling VPP and power-sharing operations. Accordingly, in addition to granting additional incentives to users who park for long periods, it is desirable to grant increased incentives for users who reserve the parking lot further in advance (advance notification users). This applies not only to sharing, but also to VPP. Accordingly, although in the foregoing example, an incentive is additionally granted to a user who adheres to the plan in step S907 of FIG. 9, an incentive may be granted additionally to a user who uses the parking lot continuously for a long period of time and/or a user who makes a reservation further in advance. A "long period of time" is set in advance as a suitable period of time, for example, and if a use period corresponds to that set period, an incentive corresponding to that period may be added. Similarly, with respect to advance reservations, an incentive may be granted based on how far in advance of the use the reservation is. However, advance reservations are meaningless if the user does not adhere to them, and thus the configuration may be such that the incentive is not granted simply for use; instead, whether the use matches the actual usage period may be determined in the same manner as in step S905, with the incentive being added if a match is determined.

Additionally, the cost of power can be reduced, and profit from selling power can be increased, by a vehicle using its own power source as the charging power source instead of grid power. Furthermore, providing a priority level based on restrictions in the charging schedule makes it possible to determine the schedule in accordance with how necessary charging is. Further still, as with car sharing, the charging/discharging schedule may be determined in accordance with a planned entry (entry reservation) by a reliable user.

Note that in the foregoing embodiment, a vehicle for which entry is reserved is used only for sharing, and is not used for VPP. However, the processing of FIG. 5 is only aimed at vehicles that have actually entered, and may therefore be expanded to vehicles for which an entry reservation has been made by a reliable user, as described with reference to FIG. 8A. However, in this case, the amount of power remaining in the vehicle for which the entry reservation has been made is unclear, and it is therefore desirable to determine the schedule assuming an appropriate value for the remaining amount, e.g., 0. By doing so, in a system where bids are made for demand response, the amount of power that can be supplied, for example, can be presented, and bids can be made thereon, even for future demand response, such as 5 minutes later, one hour later, one day later, and so on.

Additionally, in the present embodiment, even a vehicle user who does not have a parking space or charging equipment at his or her own home can own an EV by using the parking lot according to the present embodiment. For example, a person can own an EV even in a residential environment where he or she cannot prepare his or her own charging equipment, such as an apartment, condominium, or the like. Additionally, incentives for participating in VPP may not only cancel out parking fees, charging fees, and so on, but may also, depending on the circumstances, provide revenue beyond that amount. Furthermore, when automated driving is implemented in the future, it may become possible for vehicles to automatically return to parking lots, making it unnecessary for users to provide parking spaces. In light of this, the value of the invention according to the present embodiment for the user is not limited merely to incentives for participating in VPP at a charging station. For example, (1) using the parking lot according to the present embodiment makes it unnecessary for a vehicle user to provide a parking space, charging equipment, and so on at his or her own home, and thus the incentives granted make it possible to minimize costs involved with vehicle ownership, such as parking fees, charging fees, and so on. (2) If the vehicle is an automated vehicle, the vehicle can move from the owner's house to the parking lot automatically, making it unnecessary for the user to drive to the parking lot; this eliminates parking worries, the burden of movement, and so on, making it even easier to participate in VPP and enjoy the profits therefrom. (3) Once profit can be obtained from VPP, car sharing, and the like, the purchase cost of the vehicle can also be recouped, which increases the economic benefits for the user.

Additionally, charging control compliant with demand response can be carried out even if the station equipment cannot supply power from the onboard power unit to the grid, and is capable only of charging. In this case, although power cannot be supplied to the grid through VPP, it is still possible to respond to requirements for throttling demand. Accordingly, by skipping the discharging schedule carried out in step S511 of FIG. 5, for example, a charging schedule based on demand response can be set for a station that carries out charging only, which makes it possible to contribute to reduce power consumption.

SUMMARY OF EMBODIMENTS

The present embodiment described above can be summarized as follows.

(1) A vehicle management system (101) that carries out at least one of controlling a supply of power from an onboard power unit in a parked vehicle to the exterior and controlling charging of the onboard power unit from the exterior. The system includes: control means (203) for controlling the supply of power or charging between the onboard power unit and the exterior; transaction managing means (201) for managing the supply of power or charging between the onboard power unit and the exterior; and payment point setting means (2041) for setting a payment point (216) for a user associated with the parked vehicle. The payment point setting means sets the payment point on the basis of transaction information (215) recorded by the transaction managing means.

According to this configuration, by providing a payment point, a user can be motivated to participate in VPP, which makes it possible to secure a scale of power operations suited to demand response.

(2) The vehicle management system according to (1), wherein the exterior is a power grid, and the control means controls at least one of the supply of power from the onboard power unit and the charging of the onboard power unit in accordance with price information indicating a price of power supplied from the power grid and a price of power supplied to the power grid.

According to this configuration, profit can be secured by carrying out power transactions in light of the power market.

(3) The vehicle management system according to (1) or (2), further including parking schedule managing means (204, 220) for accepting and storing an input of a parking schedule of a vehicle. The control means (203) controls the supply of power from the onboard power unit to the power grid or the charging of the onboard power unit in accordance with the parking schedule; and the payment point setting means further sets a payment point for a user who has parked the parked vehicle in accordance with the parking schedule.

This provides a motivation to communicate parking plans and park according to those plans, which makes it possible to systematically advance power operations according. Specifically, even if future power supply/demand adjustments are expected, requests to adjust the power supply/demand can be responded to in accordance with parking plans, which contributes to future supply/demand planning.

(4) The vehicle management system according to (3), wherein the payment point setting means (2041) sets the payment point in accordance with at least one of a time at which the parking schedule managing means (202) has accepted the parking schedule, or a length of a parking time in the parking schedule.

According to this configuration, a user can be prompted to park for a long parked period by communicating parking plans in advance, which makes it possible to advance power operations systematically.

(5) The vehicle management system according to (3) or (4), further including sharing managing means (202) for sharing the parked vehicle in accordance with the parking schedule. The payment point setting means 2041) further sets the payment point for a user who provides the parked vehicle on the basis of a usage performance in the sharing.

According to this configuration, carrying out sharing as power resource operations makes it possible to implement more diverse operations, which in turn makes it possible to anticipate higher profits. Specifically, by adding a payment point for a user who provides his or her vehicle for car sharing, the capacity for storing power can be increased for the parking lot as a whole, and effects of increasing profits and leveling the power supply/demand can be expected to be achieved.

(6) The vehicle management system according to any one of (1) to (5), further including managing means for managing the payment point set for a user of the parked vehicle. The managing means returns the payment point to the user as a parking fee use bonus.

According to this configuration, an increase in the user base can be expected by reducing the cost of the parking lot.

(7) The vehicle management system according to any one of (1) to (6), further including managing means for managing the payment point set for a user of the parked vehicle. The managing means returns the payment point to the user as a charging equipment use bonus.

According to this configuration, user participation can be prompted by reducing charging costs.

(8) The vehicle management system according to any one of (1) to (7), wherein the onboard power unit is one of a battery, a fuel cell, an internal combustion power generator, and a gas generator.

According to this configuration, the system can handle a variety of vehicles, and thus a wide range of users can participate.

(9) The vehicle management system according to any one of (1) to (8), further including intent confirming means (204) for confirming intent of a user of the parked vehicle to license control of the supply of power or charging.

According to this configuration, the supply of power can be controlled only for vehicles whose users have made clear their intent to license, which makes it possible to carry out operations according to the user's intent.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A vehicle management system that carries out at least one of controlling a supply of power from an onboard power unit in a parked vehicle to the exterior and controlling charging of the onboard power unit from the exterior, the system comprising:
   a control unit configured to control the supply of power or charging between the onboard power unit and the exterior;
   a transaction managing unit configured to manage the supply of power or charging between the onboard power unit and the exterior;
   a payment point setting unit configured to set a payment point for a user associated with the parked vehicle;
   a parking schedule managing unit configured to receive and storing an input of a parking schedule of a vehicle; and
   a sharing managing unit configured to manage the parked vehicle as a sharing vehicle in accordance with the parking schedule,
   wherein the payment point setting unit sets the payment point on the basis of transaction information recorded by the transaction managing unit,
   wherein the control unit controls the supply of power from the onboard power unit to the power grid or the charging of the onboard power unit in accordance with the parking schedule,
   wherein the payment point setting unit further sets a second payment point for a user who has parked the parked vehicle in accordance with the parking schedule, and
   wherein the sharing management unit determines a user to whom the second payment points exceeding a threshold have been given to be a reliable user and manages as the sharing vehicle a vehicle of the reliable user including a vehicle to be parked.

2. The vehicle management system according to claim 1, wherein
   the exterior is a power grid; and
   the control unit controls at least one of the supply of power from the onboard power unit and the charging of the onboard power unit in accordance with price information indicating a price of power supplied from the power grid and a price of power supplied to the power grid.

3. The vehicle management system according to claim 1, wherein
   the payment point setting unit sets the payment point in accordance with at least one of a time at which the parking schedule managing unit has accepted the parking schedule, or a length of a parking time in the parking schedule.

4. The vehicle management system according to claim 1, wherein the payment point setting unit further sets the payment point for a user who provides the parked vehicle on the basis of a usage performance in the sharing.

5. The vehicle management system according to claim 1, further comprising:
   a managing unit configured to manage the payment point set for a user of the parked vehicle,
   wherein the managing unit returns the payment point to the user as a parking fee use bonus.

6. The vehicle management system according to claim 1, further comprising:
   a managing unit configured to manage the payment point set for a user of the parked vehicle,
   wherein the managing unit returns the payment point to the user as a charging equipment use bonus.

7. The vehicle management system according to claim 1, wherein
   the onboard power unit is one of a battery, a fuel cell, an internal combustion power generator, and a gas generator.

8. The vehicle management system according to claim 1, further comprising:

an intent confirming unit configured to confirm intent of a user of the parked vehicle to license control of the supply of power or charging.

\* \* \* \* \*